United States Patent [19]

Peng

[11] 4,105,803

[45] Aug. 8, 1978

[54] SOYBEAN-CHEESE WHEY FOOD PRODUCT

[75] Inventor: Andrew C. Peng, Columbus, Ohio

[73] Assignee: Ohio Agricultural Research and Development Center, Wooster, Ohio

[21] Appl. No.: 793,048

[22] Filed: May 2, 1977

[51] Int. Cl.$^2$ .......................... A23C 21/00; A23J 1/14; A23J 1/20

[52] U.S. Cl. .................................. 426/583; 426/582; 426/634

[58] Field of Search .................... 426/36, 39, 46, 582, 426/583, 634, 580

[56] References Cited

U.S. PATENT DOCUMENTS

| | | | |
|---|---|---|---|
| 2,344,090 | 3/1944 | Huber et al. ............... 426/580 X |
| 2,716,063 | 8/1955 | Shearer ........................ 426/583 |
| 2,952,543 | 9/1960 | Szczesniak et al. ......... 426/656 X |
| 3,455,698 | 7/1969 | Vakaleris .................... 426/582 X |
| 3,594,192 | 7/1971 | Mullen et al. ............... 426/656 X |
| 3,743,514 | 7/1973 | Lundstedt et al. .......... 426/39 X |
| 3,798,339 | 3/1974 | Peng ............................ 426/580 |
| 3,840,670 | 10/1974 | Holt ............................ 426/41 |
| 3,857,970 | 12/1974 | Tsumura et al. ............. 426/46 |
| 3,873,751 | 3/1975 | Arndt .......................... 426/583 |
| 3,891,777 | 6/1975 | Boyer .......................... 426/573 |
| 3,937,843 | 2/1976 | Osaka et al. ................. 426/46 |
| 3,966,992 | 6/1976 | Banks et al. ................. 426/583 |
| 3,982,025 | 9/1976 | Hashimoto et al. .......... 426/46 |

OTHER PUBLICATIONS

Sasaki et al., The Manufacture of Synthetic Milk Powder from Whey and Soy-Bean, Proc. 13th International Dairy Conference, vol. 4, 1953, pp. 602–605.

Holsinger, V. H., The Use of Cheese Whey in Beverages, Proceedings Whey Products Conference, USDA, ARSERRL, No. 3779, Eastern Regional Research Center, Philadelphia, Pa., 2/1973, p. 43.

Badui et al., Nutritious New Drink Uses Whey and Plant Proteins, Ohio Report, vol. 59, No. 2, 1974, pp. 37–38.

*Primary Examiner*—David M. Naff
*Attorney, Agent, or Firm*—Sidney W. Millard

[57] ABSTRACT

A soybean-cheese whey curd-type food product is made by coagulation of a soybean and cheese whey protein mixture with selected precipitants. Preferred precipitants include glucono-delta-lactone (GDL) and combinations of the latter with calcium sulfate or magnesium chloride. A white, soft, gelatinous mass is developed having a desirable bland aroma, improved yield, desirable moisture content and advantageous amino acid composition.

19 Claims, 6 Drawing Figures

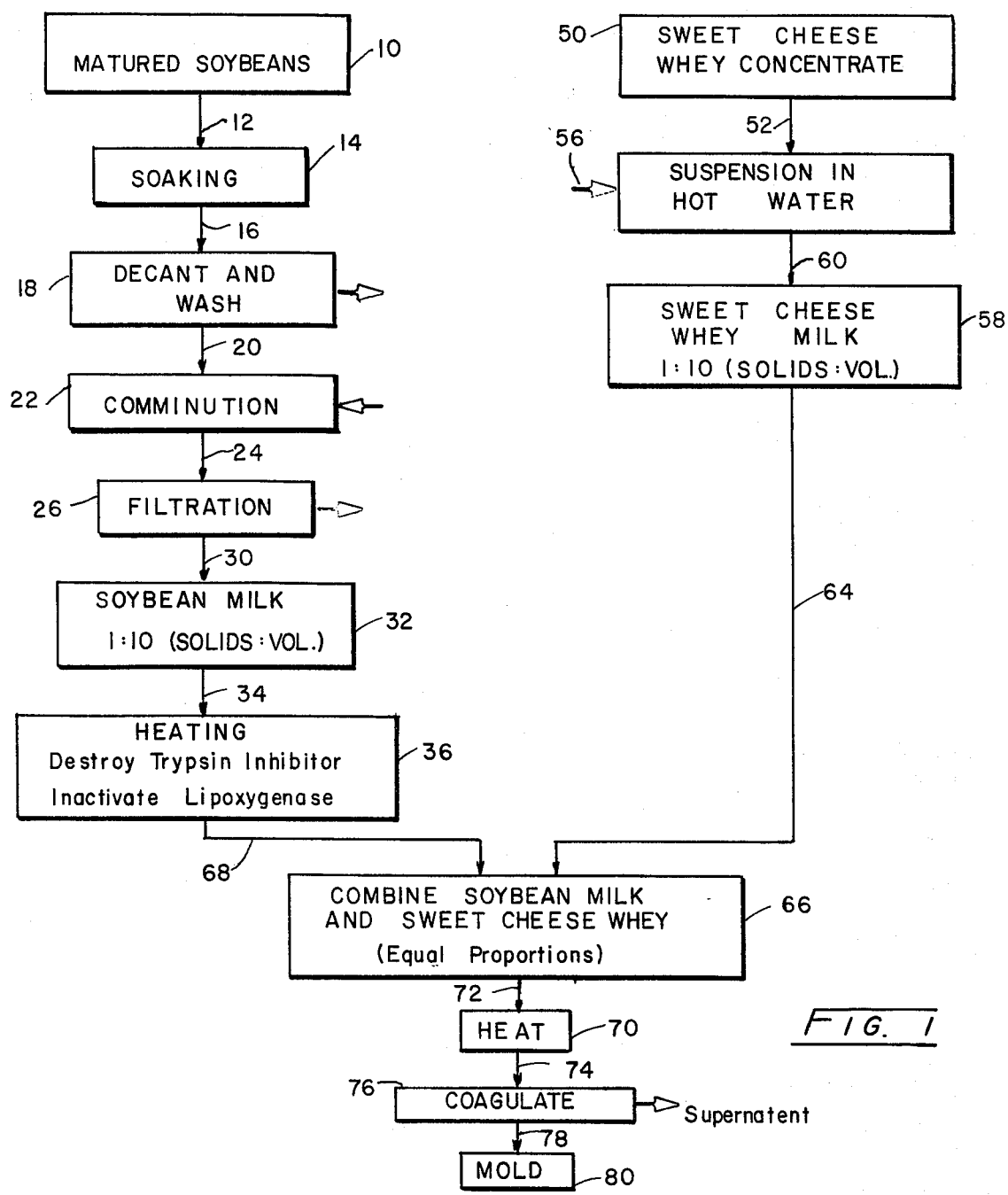

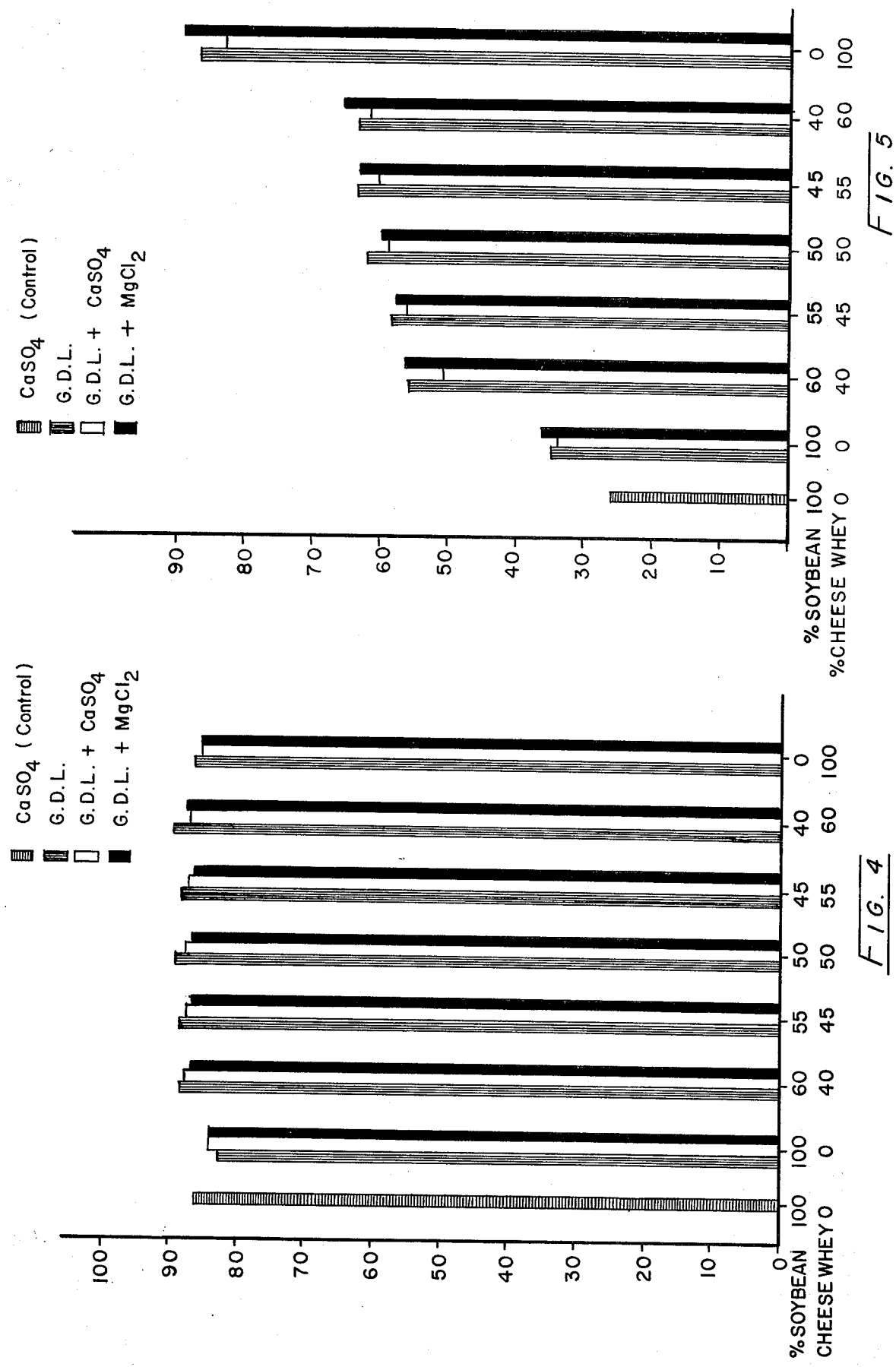

SOYBEAN-CHEESE WHEY FOOD PRODUCT

BACKGROUND

Investigators in the field of food technology have been witnessed to exhibit a continuing interest in the development of nutritional food products both through the utilization of often discarded food processing by-products, such as milk whey, and through the substantially direct conversion of vegetable proteins, for example the conversion of soybean material to dairy or meat substitute foodstuffs. With the former, expanded food utilization efficiencies are promised through a productive conversion of by-products otherwise wasted, and with the latter, a more direct and, theoretically, less expensive production of food products is envisioned.

Soybeans (Glycine max) have long been considered to be an important source of protein, their cultivation having originated before written record in Eastern Asia. Appropriately treated, soybean materials represent an inexpensive source of protein. In the more basic of such treatments, a soybean milk is produced, the earliest and simplest technique for its preparation involving the sequential steps of washing, soaking, grinding, filtering and boiling. Of this process, the latter step of boiling is provided to destroy trypsin inhibitor as well as to inactivate lipoxgenase, which is considered as the cause of rancidity and off-flavor. See in this regard:

I. Mattick, L. R., W. F. Wilkens, and D. B. Hand. "Precursors of Volatile Off-flavor in Soymilk." N.Y. Agric. Exp. Sta. Bull. 1966 (prepublication)

The population of the Western World, not having a longstanding tradition of utilizing soymilk type products, considers the taste thereof to be somewhat objectionable, the aroma of the food being considered by that population as unpleasant (i.e. beany and bitter). This aspect of the potential food long has been considered an important problem to be solved as a prelude to acceptance in the western sector of the world population.

Approaches have been made to adjust soymilk products to the western palate, for example, it has been theorized that by asserting control over the sodium ion concentration of soymilk, an effective mechanism will be provided for improving the flavor thereof. See in this regard:

II. Bourne, M. C., E. E. Escueta, and J. Banzon. "Effect of Sodium Alkalis and Salts on pH and Flavor of Soymilk." J. Food Sci. 41(1) :62, 1976.

The development of a bland flavored soymilk product more suited to western taste has been described as being carried out through a blanching treatment of whole soybeans with sodium bicarbonate prior to a grinding thereof. This treatment effects an enzyme inactivation as well as a trypsin inhibitor inactivation. In this regard see:

III. Nelson, A. I., M. P. Steinberg, and L. S. Wei. "Illinois Process for Preparation of Soymilk." J. Food Sci. 41(1) :57, 1976.

Additional discussion concerning the development of a taste or aroma-free soybean product is provided, for example, in U.S. Pat. No. 3,937,843.

Perhaps the most important soybean product providing protein to the Asian population of the world is a soybean curd known to the Chinese as "dow foo" or, to the Japanese, as "tofu". The production of such soybean curd follows somewhat generally accepted process steps, for example, whole soybeans are washed and soaked for a given period in cold water, following which they are ground in the presence of cold water and the slurry then is filtered. The resultant soybean milk is then steamed for about thirty minutes, cooled to a selected temperature and precipitated. The precipitant traditionally used is calcium sulfate. Following removal of the supernatant liquid, the curd usually is placed in molds and gently pressed to achieve a desired moisture content. The procedure for this process is described in more detail, for example in:

IV. Liang Chiu. W. C., and F. O. van Duyne. "Soybean Curd Preparation, Calcium Content and Palatability." Illinois Res. Fall 1961, p.6.

V. Miller, C. D., H. Denning, and A. Bauer. "Retention of Nutrients in Commercially Prepared Soybean Curd." J. Food Res. 17:261, 1952.

Generally, the soybean curd also is considered to exhibit a "beany" taste characteristic to western palate. This taste, as well as the texture of the curd developed, depends upon numerous factors including the soybean cultivar selected as well as the type of extraction and coagulant utilized in precipitation procedures. In the latter regard, the more common precipitation procedure provides for the addition of salts to increase the ionic strength of the soymilk solution. Alternately, acids may be introduced to the solution to reduce its pH to the isoelectric point thereof. Investigations have been carried out with respect to precipitation procedures wherein salts of strong acids such as calcium chloride, magnesium chloride ferric chloride and sodium bisulfate were utilized. Additionally hydrochloric acid has been used as an effective curdling agent. See in this regard:

VI. Loska, Jr., S. J., and D. Melnick. "Laboratory Procedure for Evaluating the Curd-producing Capacity of Soya Products." Cereal Chem. 27:127, 1950.

Studies of the production process further have indicated that coagulation of soybean protein by the addition of a salt represents the more difficult step in the process of curd formation. For example, the incorporation of insufficient amounts of salts or the addition of salt at too rapid a rate not only creates an incomplete precipitation of protein, but also results in a turbid suspension making it difficult to separate the precipitating protein. Additions of excessive salts result in what is considered too hard a soybean curd product. As may be expected, different salts produce differences in quality of the product, for example calcium sulfate serves to coagulate the proteins slowly to form a smooth gel-like product, whereas magnesium sulfate provides a flocculant precipitate. In the above regard, reference is made to:

VII. Wang, H. L. "Products from Soybeans--to Meeting Rising Processor Interest, Tofu Process--on a Laboratory Scale." Food Technol. 21(15) :115, May 1967.

The temperature present at the precipitation stage has been described as one factor which markedly influences the coarseness as well as other physical properties of the resultant curd, for example, such influence is described in the following publication:

VIII. Smith, A. K. Oriental Methods of Using Soybeans as Food with Special Attention to Fermented Products and Notes on Oriental Farming Practices. USDA, ARS—71-17, Northern Regional Research Center, Peoria, IL, 1961, p.19.

Studies of the nutritional value of soybean curd have reported that, with the exception of the limiting amino acids methionine and half cystine, all of the amino acids essential to nutrition are present. In this regard, reference is made to the following publication:

IX. Schroder, D. J., J. I. Elliot, and H. Jackson. "Nutritional Studies on Soybean Curd Produced by Calcium Sulfate Precipitation of Soybean Milk." J. Food Sci. 38:1091, 1973.

Turning now to the noted by-product of the dairy industry, whey is the serum which remains after the coagulation of the casein and fat when cheese is manufactured. It comprises principally water and six to seven percent solids including most of the ash of the original milk, milk sugar and proteins. These proteins represent about eighteen percent of the total protein in milk and the water soluble proteins in this whey are mainly beta-lactoglobulin and alpha-lactalbumin. The two proteins together with other minor protein fractions are commonly referred to as lactalbumin. Lactalbumin is a complete protein fully available to the human body and has been recognized as being highly superior to most other proteins in animal nutrition. In this regard, reference is made to the following publications:

X. Wingerd, W. H., S. Saperstein, and L. Lutwak. "Bland, Soluble Whey Protein Concentrate has Excellent Nutritional Properties." Food Technol. 24(7):34 1970.

XI. Vaughan, D. A. Nutritional aspects of whey as a food. Proceedings Whey Utilization Conference, USDA, ARS—73-69. Eastern Regional Research Center, Philadelphia, PA. 1970 p. 78.

Cheese wheys further may be categorized as "sweet whey" or "acid whey," such categorization generally depending upon the pH valuation as the whey is removed from a cheese processing vat. Generally a sweet whey will exhibit a pH of about 6.2, while an acid designated whey exhibits a pH of about 4.7. Continued bacterial action following removal from the processing vat tends to effect a continual lowering of the pH values of whey to about 4.5, whereupon most bacterial action has been observed to cease. Of course, drying the whey as by spray drying or the like to form powders will arrest the pH value, as will pasteurization techniques and the like. The price of food-grade cheese whey, for example, with respect to the corresponding price of non-fat dry milk is of considerably lower level, for example about four times lower. As in the case of the soymilk products, cheese wheys tend to exhibit a taste or aroma characteristic not particularly acceptable to the human palate. This characteristic sometimes is described as being "raw milky."

Combinations of soybean material with cheese whey products have been proposed. Fluid acid or sweet cheese whey has been mixed with soybean flour and citrus flavoring to produce protein beverages, as disclosed in the following publication:

XII. Holsinger, V. H. "The Use of Cheese Whey in Beverages." Proceedings Whey Products Conference, USDA, ARS, ERRL, Publ. No. 3779, Eastern Regional Research Center, Philadelphia, PA Feb. 1973, p. 43.

Further, a milk substitute product has been prepared by mixing soybean material with whey, as described in Peng, U.S. Pat. No. 3,798,339. Another proteinaceous drink developed from cheese whey, sesame and soybean milk exhibiting an increase in sulfur concentration in terms of sulfur containing amino acids has been described in the following publication:

XIII. Badui, S. and A. C. Peng. Nutritious new drink uses whey and plant proteins. Ohio Report 59(2):37. 1974.

SUMMARY

The present invention is addressed to a nutritious food product which is derived from a combination of the byproduct, sweet cheese whey, and soybean and which exhibits a highly desired bland or neutral taste. This taste is characterized in neither exhibiting the "raw milk" flavor associated with cheese whey products, nor in exhibiting the "beany" flavor associated by Westerners with soybean products. Of additional importance, the product is formed by a process which does not heatdenature the protein content contributed thereto by the cheese whey solids. The food product of the invention is characterized in exhibiting a smooth, semi-soft, pudding-like texture which is ideally suited for use as bakery product filling, flavored pudding and broad varieties of consumables.

A further object and feature of the invention resides in the utilization of a precipitant which achieves the requisite co-precipitation of solids from the soybean and sweet cheese whey starting products which does not obstruct the development of the ideally bland taste and which permits the development of desired texture. The precipitant is added in relatively small amounts with respect to the volume of aqueous suspended comminuted soybean material and admixed aqueous dispersion of proteinaceous cheese whey solids. This precipitant has, as a principal ingredient, gluconodelta-lactone which is added in an amount representing a ratio less than about 0.01 weight-to-volume of an aqueous mixture of soybean and sweet cheese whey solids. In a preferred embodiment of the invention, soybean solids and cheese whey solids are admixed in substantially equal proportions to provide a starting soybean-cheese whey milk. Coagulation of this mixture with select precipitants then is carried out to derive the food product of the invention.

Another object of the invention is to produce an improved semi-soft proteinaceous food product by a process advantageously utilizing by-products of the cheese manufacturing industry as well as abundantly available soybean materials.

Other objects of the invention will, in part, be obvious and will, in part, appear hereinafter. The invention, accordingly, comprises the product and process exemplified in the following detailed disclosure.

BRIEF DESCRIPTION OF THE DRAWINGS

FIG. 1 is a flow chart illustrating a process for producing the product of the invention;

FIG. 4 is a chart relating moisture content with variations in the formulations of the food product of the invention;

FIG. 5 is a chart relating percentage yields with relative formulations of the product of the invention; and FIG. 6 is a diagrammatic representation relating product formulations with corresponding taste characteristics.

DETAILED DESCRIPTION

Figure 3:
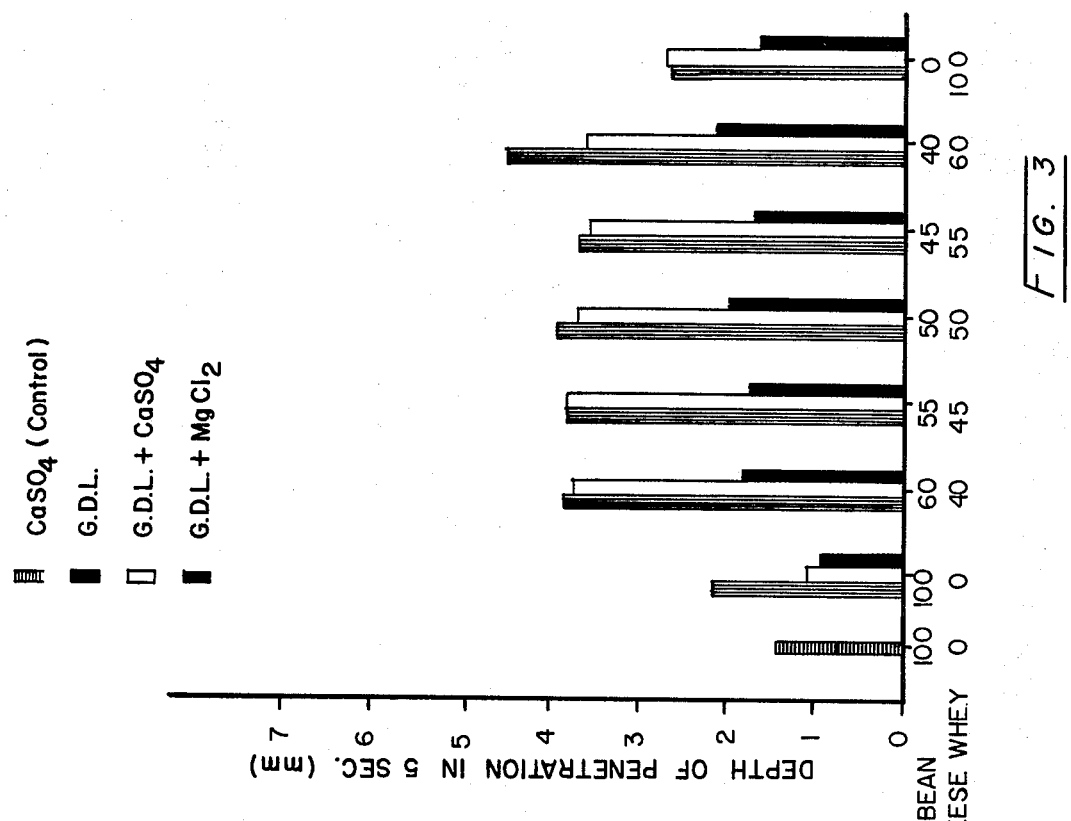
FIG. 3 is a chart comparing product formulations with depth of penetration test results, showing relative textures thereof.

Referring to FIG. 1, a block diagramatic representation of the method for producing the soybean-cheese whey product of the invention is revealed. In its general aspects, the method comprises a procedure wherein a soymilk is produced from edible soybean material. This soymilk then is utilized in combination with cheese whey to develop the product of the invention.

The cheese whey may be utilized in the direct liquid suspension form from which it is initially derived in the cheese making process, or may be reconstituted as a liquid suspension from commercially available dried cheese whey products. With the latter approach, conveniences in manufacture are realized, inasmuch as the basic whey raw material may be stored until such time as the product manufacturing process is prepared to receive it.

The soymilk and cheese whey are admixed in a predetermined proportion and then coagulated with select precipitants to derive the product. This precipitated product then is transferred to molds for treatment as by flavoring or the like to enter the marketplace, or may be dried for later reconstitution with water to reform a semi-soft, pudding-like food. Success in achieving an ideally bland food product suitable for flavoring and having an appropriate texture is determined by both the initial mixture of the materials as well as the technique involved in their coprecipitation.

Looking to the figure, the provision of an initial edible soybean material is represented at block 10. Soybean cultivars differ in protein content, oil content, color and size of seed such that the particular development of a soymilk from them may be varied accordingly. For a description of such cultivar variations, reference is made to the following publications:

XIV. Smith, A. K., T. Watanabe, and A. M. Nash. "Tofu from Japanese and United States Soybeans." Food Technol. 14(7):322, July 1960.

XV. Saio, K., M. Kamiya, and T. Watanabe. "Food Processing Characteristics of Soybean 11 S and 7 S Proteins. Part I. Effect of Difference of Proteins Components among Soybean Varieties on Formation of Tofu-gel." Agric. Biol. Chem. 33(9):1301, 1969

In addition to the above, it has been determined that the yield of a tofu-type curd made using a typical calcium sulfate precipitant may vary with a particular soybean cultivar. As described in publication IV above, a higher yield may be realized through the use of Jogun beans for calcium sulfate precipitated tofu.

As represented by line 12 and block 14 in the drawing, the selected edible soybeans are subjected to cool water soaking as the initial step in a cold water extraction procedure. This procedure is selected by virtue of experience in the development of soybean curd, it having been reported that the yield and recovery of protein in tofu are higher with such process as opposed to boiling water grinding procedures. In this regard, reference is made to the following publication:

XVI. Mahajan, N. C., and A. C. Peng. "Soy Milk and Tofu. "Ohio Report, 57(1); 14, Jan./Feb. 1972.

Preferably, the soybeans are soaked, as represented at block 14, in about 4 volumes of cold tap water (about 5° C) for about 12 hours. As represented by line 16 and block 18, following the soaking procedure at block 14, the soaking water is decanted and the beans are washed. The washed beans then are submitted to a comminution or grinding step, as represented by line 20 and block 22. In this step, cold tap water is added with the washed beans and grinding to a fine suspension is carried out. For small scale experimental operations, such grinding, may be effected with a typical blender for a period of about three minutes. The addition of water during the grinding step preferably is such as to develop a soybean solids-to-water volume of about 1:10. The output of comminution stage 22 is directed, as shown along line 24, to a filtration stage 26. At this stage, that particulate residue of the solids component of the soybean material which is not in suspension is removed, as is represented by an arrow. The residue developed at 28 may be utilized as a food product, for instance in animal feeds or the like. To improve the yield of the process, however, a second extraction of the soy material may be carried out by blending the residue with cold water again, followed by a second straining procedure. The milky fluid filtrate derived from stage 26, as at line 30 and block 32, is known as "soybean milk". This soymilk may be constituted, for example, as a 1:10 ratio of solids of soybean or proteinaceous material to total volume of the mixture.

The soymilk filtrate 32 then is directed, as indicated by line 34, to a heating stage, represented by block 36. Stage 36 has the purpose of destroying trypsin inhibitor, and inactivating lipoxygenase, which otherwise may cause rancidity and off-flavor in the resultant soybean products. (See publication I supra). Generally, the heating is carried out by elevating the temperature of the soybean milk to boiling for an interval of at least about 15 minutes. During this process, to control foaming, a small amount of defoamer may be added, for example, Antifoam FG-10 emulsion produced by Dow-Corning Chemical Co. Inc. Additionally, a reflux type heating may be utilized wherein foam evolved is condensed and returned to the heated liquid.

Turning now to the sweet cheese milk whey components of the product of the invention, as indicated above, this component may be derived directly from the dairy product processing industry. The type of whey utilized is referred to as "sweet" cheese whey, typical wheys being the serum which remains after the coagulation of the casein and fat when cheese is manufactured. This type cheese whey is available, for example, from the processing of cheddar-type cheese (representing about 75% of cheese production) and exhibits a relatively higher pH, for instance around 6.2 than "acid" cheese wheys, which generally exhibit pH values of about 4.7. The whey serum principally is comprised of water and the solids identified earlier. For the instant utilization, the ratio of solids to total volume of the whey should be selected as equivalent to that of the soybean milk derived as at block 32. As a convenient alternative to the utilization of the direct cheese-whey by-product, a cheese whey protein concentrate may be substituted. One such cheese whey concentrate which is equivalent to a sweet cheese whey is a sodium cheese whey concentrate marketed under the trade designation "Protolac" by Borden Co., Columbus, Ohio. The approximate composition of this material is represented in Table 1.

TABLE 1

| Cheese Whey Concentrate (percent by weight) | |
|---|---|
| Protein | 55 – 60% |
| Phosphorus | 3.5 – 3.9% |
| Lactose | 18 – 20% |

TABLE 1-continued

| Cheese Whey Concentrate (percent by weight) | |
|---|---|
| Sodium | 2.6 – 3.1% |
| Fat | 6 – 8% |
| Moisture | 3 – 5% |
| Ash | 16 – 18% |

The provision of a sweet cheese whey concentrate is represented in FIG. 1 at block 50. The amount, by weight, which is provided is that selected to provide a whey solids content for the ultimately derived cheese whey milk which is equivalent to the corresponding solids content of soybean material within soymilk developed as at block 32. The sweet cheese whey concentrate is delivered, as indicated by line 52, to a stage represented by block 54, wherein it is admixed with relatively hot water. The input of water to the stage is indicated at 56, and the amount of concentrate added is such as to give the desired equivalents of solids-to-volume, for instance, 1:10, as generated in the production of the soymilk constituent. Upon being thoroughly dispersed in the hot water as at stage 54, a cheese whey milk is provided, as indicated, at block 58 and line 60. While the solids weight-volume ratios for the materials as at blocks 32 and 58 may be varied, it will be seen that a preferred ultimate product will be derived when these ratios are the same with respect to relative solids content. The sweet cheese whey milk provided at block 58 is admixed with an equivalent amount of soybean milk as represented at block 66. Note in this regard that the addition of sweet cheese whey milk, as represented by line 64, is directly to the mixing or combining step 66, whereas the input of soybean milk from block 32 includes heating step 36 following which, as indicated by line 64, the thus treated soybean milk is introduced to stage 66. By avoidance of the heating step in connection with the provision of sweet cheese whey milk, the important protein content thereof is not denatured. Generally, such denaturing effects will be witnessed at about the boiling point of the whey.

The proteinaceous food product of the instant invention is derived by the co-precipitation of the soybean-cheese whey milk mixture represented at block 76. Prior to this precipitation stage, the combined milk is heated, for example to about 92° C, as represented by block 70 and line 72. Upon reaching desired temperature, as indicated by line 74 and block 76, precipitation or coagulation is carried out by the addition of a proper precipitant. The selection of this precipitant is important to the invention and the criteria of that selection will be seen to be based upon achieving highest yield, most desired texture of resultant curd and an acceptable aroma in the curd. Following precipitation, as indicated by line 78 and block 80, the precipitated material or curd is moved to a mold whereupon, for example, its moisture content and consistency may be adjusted by the assertion of an appropriate pressure through techniques generally utilized in the production of curd-type food products. Not shown in FIG. 1 are the optional steps of drying the material for use in finely powdered form, such procedures being known in the art.

In accordance with the present invention, it has been discovered that the quality of the final product, as such quality considers the noted yield, texture of the curd and acceptable aroma or taste as it relates to the American palate, can be optimized through an appropriate selection of the relative proportioning of the soybean-cheese whey mixture and, additionally, to the proper selection of precipitant. In the latter regard, during the course of studies leading to the instant invention, an investigation as to those chemicals which can be used as precipitants for making an optimized soybean type curd was carried out. Once this selection was optimized, application of such study was made to the development of a soybean-cheese whey curd. Following optimization of the selection of precipitant based on the above considerations, the study then turned to an investigation of the optimization of the mixture of the soybean and cheese whey milk mixture. This approach to the development of the food product of the invention was taken, inasmuch, as is described in detail later herein, the soymilk precipitation procedure is one derived through a "salting effect". Cheese whey, on the other hand, generally can be precipitated only through the alteration of pH to the isoelectric point thereof. Accordingly, it is necessary to find a precipitant which optimally co-precipitates the mixture notwithstanding the situation that two chemical phenonena well may be involved.

Several organic and inorganic compounds were evaluated as precipitants for soybean curd, each being evaluated with respect to yield, texture and aroma acceptable to the western palate in a resulting curd. The salt-type precipitants studied were: calcium sulfate, calcium chloride, magnesium sulfate, magnesium chloride, ferrous sulfate, magnesium oxide, magnesium carbonate, calcium carbonate, potassium acetate, sodium acetate, calcium lactate and potassium tripolyphosphate. The acids evaluated were: hydrochloric acid, acetic acid, lactic acid, maleic acid, citric acid, ascorbic acid and tartaric acid. Other precipitants investigated were: carrageenan, carboxymethyl cellulose, and glucono-delta-lactone (GDL).

The soybean milk utilized in evaluating the precipitants was prepared by the cold water extraction method described hereinabove in connection with publication XVI. More particularly, the procedure involved the steps of: (a) weighing out a proper amount of whole soybeans and cleaning them; (b) the clean soybeans were soaked in about 4 volumes of cold tap water equivalent thereto and refrigerated for about sixteen hours; (c) the soaking water was decanted and discarded and the beans were finely ground with fresh cold tap water utilizing a blender manufactured by Waring Co., the grinding being carried out for about three minutes; (d) the resultant soybean slurry was strained through four layers of cheesecloth and the residue was blended with cold tap water again and strained. The final ratio of soymeal to water was 1:10 (weight to volume). A few drops of the above-identified antifoamant was added to the soybean milk and the mixture was boiled at least fifteen minutes to destroy trypsin inhibitor and to inactivate lipoxygenase.

The precipitation of soybean milk generally is carried out through a "salting out" effect. This effect stems from the principle that when protein is precipitated using salts in low concentration, such salts serve to increase the solubility of the protein. However, when the concentration of salts is greatly increased, the solubility of protein tends to decrease, and at very high salt concentration, depending upon the protein, a complete precipitation thereof may be witnessed. In the above regard, reference is made to the following publications:

XVII. Lehninger, A. L. Biochemistry. Worth Publishers, Inc., New York, NY, 1970, p. 133.

XVIII. White, A., P. Handler, and E. L. Smith. Principles of Biochemistry. 5th Ed. McGraw-Hill Book Co., A. Blakiston Publication, New York, NY 1973, p. 118.

The theory or mechanism of the salting-out phenomenum is complex, di- and tri-valent ions being found to be more effective than univalent ions. Generally, the effect is considered to cause a "dehydration" of the protein by the added salt. Such salt ions are considered to attract polarizable water molecules, thus making less water available to the proteins. At high salt concentrations, the number of charged groups contributed by the salt is somewhat enormous compared with those of the protein. Since the solubility of protein in water depends upon clustering of water molecules around the hydrophilic ionic groups, removal of water molecules to other ions will decrease protein solubility. Alternately, at high ionic strengths, protein is salted out. It may be noted further that, in the course of the salting procedure, the pH value of the mixture is not reduced to its isoelectric point, soybean curd precipitated by, for instance, calcium sulfate having a relatively high pH of about 6.1. In the latter regard, reference is made to the $CaSO_4$ control data point shown in FIG. 2.

Looking initially to the performance of salts as precipitants for soybean curd, it was determined that a 0.25 percent (wt/vol) concentration of calcium sulfate provided a most desired texture and yield. The group of salts including potassium acetate, sodium tartarate, potassium tripolyphosphate, magnesium oxide, magnesium carbonate and calcium carbonate were found to generally ineffective as a precipitant for the soybean protein. Of the above listing, magnesium oxide was observed to produce an objectionable aroma.

Precipitation of the soybean protein also was investigated with the following organic and inorganic salts in the weight-volume percentages indicated: magnesium sulfate (0.33%); magnesium chloride (0.33%); calcium chloride (0.50%); calcium lactate (0.58%); calcium sulfate (0.25%); and ferrous sulfate (1%). Of the above, magnesium chloride was found to produce a highest yield and good cutting surface characteristic. Further it was considered as good a precipitant as the conventionally utilized calcium sulfate. Curds formed from ferrous sulfate, however, appeared to have a grayish-brown color as well as a "chalky" aroma. This aspect was undesirable, however, the precipitant did evidence a high yield and elasticity.

Of the acids named above, the following weight-to-volume percentage additions were investigated as soy protein precipitants: acetic acid (0.35%); lactic acid (0.42%); maleic acid (0.39%); tartaric acid (0.18%); and ascorbic acid (0.44%). While these acids showed a good yield and acceptable texture, the resultant curd was found to display a strong and sour odor.

Precipitation of soy protein utilizing carrageenan and carboxymethyl cellulose (CMC) by addition of 0.5% weight-to-volume thereof was investigated. While a curd was observed to be formed, the particles thereof were of such small size as to pass through a cheesecloth and an acceptable tofu-type product was not achieved.

Several concentrations of glucono-delta-lactone (GDL) as a precipitant were investigated, for instance as percentage weight-to-volume additions thereof of: 0.4%, 0.3%, 0.25%, 0.2% and 0.15%. At the higher concentrations of this precipitant, a harder texture for tofu was found to evolve. A 0.2% addition of GDL was found to form a desired tofu product. The aroma of the resultant product, while difficult to subjectively evaluate, was observed as being slightly different from a corresponding calcium sulfate product.

Combinations of the above also were investigated. For example, calcium sulfate and carboxymethyl cellulose in amounts respectively of 0.17% and 0.5% (wt/vol) were found to precipitate particles of larger size than those from carboxymethyl cellulose alone. However, such particulate size remained of inadequate size for practical utilization. Additionally, combinations of acid and salt including the following, with the noted weight-volume addition thereof, were investigated: lactic acid (0.21%) + calcium sulfate (0.06%); acetic acid (0.18%) + calcium sulfate (0.06%); maleic acid (0.20%) + calcium sulfate (0.06%); and ascorbic acid (0.22%) + calcium sulfate (0.06%). Of the above, the textures of resultant soybean curds were noted as being somewhat harder than the textures of curd made from the acids individually but were considered softer than curds formed from calcium sulfate. The curds additionally were noted as having slightly sour aromas.

With the above information developed, precipitants for a combined soybean-cheese whey curd were investigated. As a prelude to the discourse concerning this study, however, attention initially is turned to techniques for evaluation. Evaluations of flavor and aroma were necessarily subjective in nature. Accordingly, the evaluation given in this regard should be understood as being a concensus of a sampling of tasters. However, based upon the personal preference of such tasters, the aroma of samples submitted were evaluated in three categories: "beany", "bland" and "raw milky". The most desired taste attribute to be found was considered to be a bland designation, any resultant food product then being capable of ready adjustment through the addition of popular flavorings.

The texture properties of the curds developed were measured by a penetrometer identified as a "Precision Universal Senior Model" manufactured by Precision Scientific Co., Chicago, Illinois. The samples measured with the penetrometer were prepared in a box with a flat bottom which was then transferred to a flat plate. The penetrometer incorporated a test plunger weighing about 47.5 grams and a cone weighing 43.3 grams to provide a total weight to penetrate the samples of 90.8 grams on a surface area of 77/128 square inch. The readings for the texture properties of the samples were expressed as depth of penetration in millimeters after five seconds.

Moisture content for the samples were measured using the air oven method devised by the Association of Official Analytical Chemists, as described in "Official Method of Analysis," 11th Ed., AOAC, Washington, D.C., 1970, p. 211. In general, this method provided the following series of steps: (a) the curd was thoroughly homogenized; (b) a 9 to 12 gram sample was weighed and spread evenly over the bottom of an aluminum weighing dish and weighed accurately to the second decimal place in triplicate samples; (c) samples were dried at 75° C for 48 hours in a recirculating oven; (d) the aluminum dishes were cooled in a desiccator overnight and reweighed; and (e) the moisture content of the sample was calculated and expressed as the percent of the fresh weight.

Yield for each sample was derived as follows: The curd made from thirty grams of raw material was weighed to determine the total fresh weight of curd, and the yield was calculated on a dry basis as follows:

$$\text{Yield (\%)} = \frac{\text{Total Fresh Weight} \times (100 - \text{moisture content}) \%}{\text{Weight of Raw Materials (30 grams)}}$$

The protein content for each of the sample curds was analyzed by the Micro-Kjeldahl method. This method generally involves the following steps: (a) The dried samples were ground in a Wiley mill equipped with a 20-mesh screen. This mill was completely cleaned after each use with a jet of compressed air. (b) Duplicate samples of thirty to forty milligrams of the flour from the mill were weighed into Micro-Kjeldahl digestion flasks. (c) A glass bead was added with 2 milliliters of concentrated sulfuric acid and approximately 0.25 grams of a catalyst-potassium sulfate mixture. (d) The flask and contents were placed on a digestion rack within a hood. (e) The flask and contents were heated gently at first and then more vigorously until the solution cleared, such clearing requiring about an hour. (f) Heating was continued for an additional hour following which the contents thereof were allowed to cool. Following cooling, five milliliters of distilled water were added to the flask. (g) The contents of the flask were washed into the chamber of a distillation assembly with two to five milliliters of water. (h) Eight milliliters of sodium hydroxide solution (40%) was added to the flask. (i) This mixture was distilled into five milliliters of boric acid (2%) solution containing a few drops of the screened indicator (5 parts of bromocresol green to one part of methyl red in ethanol, 0.1%). The distilling rate was five milliliters per minute. (j) The tip of the condenser was positioned below the surface of the liquid for one minute following which the tip was raised above the liquid level for two additional minutes. (k) The contents of the flask were titrated into a steel-grey endpoint with (N/70) hydrochloric acid. With the above procedures completed, the following calculations were performed: (1) The nitrogen content of the flour was computed as follows:

$$\text{Nitrogen content (\%)} = \frac{0.2 \text{ mg} \times \text{ml of } \frac{N}{70} \text{ HCl}}{\text{mg of sample}} \times 100$$

(2) The protein content was then computed as the nitrogen content multiplied by 6.25.

Looking now to an extension of the above aspects to the development of suitable precipitants for a soybean-cheese whey product, the utilization of calcium sulfate, only, as a precipitant for the soybean-cheese whey milk was generally ineffective, no discernable precipitation occuring.

Where the salts, magnesium chloride, calcium chloride magnesium sulfate and calcium acetate were utilized as a precipitant, a soybean-cheese whey curd was produced somewhat similar to that produced in the formation of pure soybean curd. The yield for the curd as made with these precipitants may be categorized as medium. Additionally, the amount of magnesium chloride (0.6% w/v) required to form the curd was less than that of calcium chloride (1% w/v), magnesium sulfate (2.67 w/v), and calcium acetate (1.33% w/v). As a consequence, magnesium chloride may be considered as the better one of those four precipitants.

With the use of GDL as a precipitant, a curd was produced which was considered softer than the acceptable pure soybean curds. Variations in this softness were obtained by varying the amount of precipitant used. Generally, it was found that suitable results are available with concentrations in weight-to-volume percent proportions of less than about 1%, 0.6% being considered optimal.

Combinations of glucono-delta-lactone (GDL) at the optimal 0.6% weight-to-volume addition with, magnesium sulfate (0.67%), calcium sulfate, (0.05%), magnesium chloride (0.17%), and ascorbic acid (0.15%) also were investigated. The combination of GDL with ascorbic acid as a precipitant was found to generate an undesirable aroma characterisitc. However, the combinations of GDL with the other of the additives listed immediately above were found to generate highly desirous curd products. The physical and chemical attributes of the products are considered in the discussion to follow.

Figure 2:
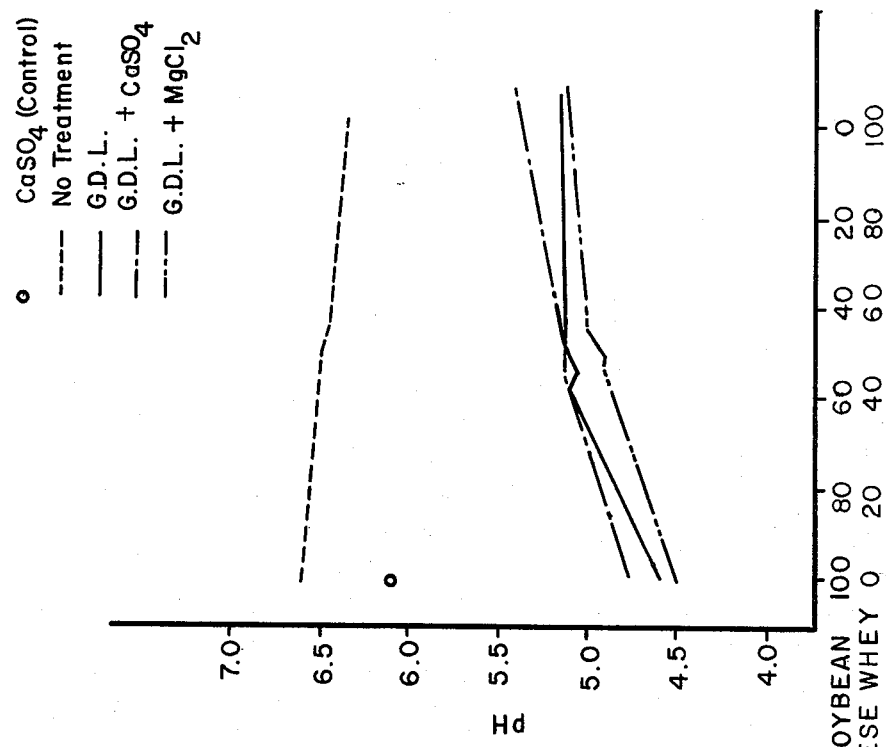
FIG. 2 is a series of curves relating the pH values of soybean-cheese whey material mixture before and following precipitation thereof.

Looking to FIG. 2, pH values of soybean-cheese whey milk mixture before and following precipitation procedures with the preferred precipitants are revealed. Note in the figure that the pH value of the soy-cheese whey milk mixture before adding precipitants was between 6.35 and 6.6. As the cheese whey concentration is elevated, the pH value of the mixture correspondingly lowers. As further is represented in the figure, the pH of the mixtures following the addition of precipitants varies depending upon the particular precipitant chosen, the range of this variation being from about 4.5 to 5.35 and all such values being lower than the pH of the original milk mixture. Note that the pH value of soybean milk precipitated with calcium sulfate stands at about 6.1, a value much higher than that of the preferred precipitants with a soybean-cheese whey mixture.

Looking to FIG. 3, texture data for the curds show that a preferred soybean-cheese whey is softer than a curd formed purely of soybean materials or a curd formed purely of cheese whey materials. The figure also reveals that a curd formed with a combination of GDL and magnesium chloride is harder than curds formed of the other preferred precipitants. This result may be due to the property of GDL which creates a gel-type precipitate within the mixture. It may be speculated that an interaction between GDL and cheese whey protein may be taking place.

Looking to FIG. 4, it may be noted that the moisture contents for the soybean-cheese whey curds vary between about 82% and 89%. The moisture contents of varying proportions of soybean cheese whey curds were slightly higher than soybean curd only and cheese whey curd only. This observation illustrates that a protein mixture of soybean and cheese whey possess a higher water-holding capacity. It is opined that the different sources of proteins may have different side chains and, when mixed, the interaction of protein molecules may effect water-holding capacity.

An illustration of the yield characteristics of the process is revealed in FIG. 5. It may be noted from the figure that, the higher the ratio of cheese whey to soybean material within the mixture, the higher the yield of the resultant curd. In comparing the two end points of the chart, a 100% cheese whey curd produced a much higher yield than a 100% soybean curd. The yields of the mixtures are very close to the average of the yields of soybean curd and cheese whey curd. Note that the yields of the product of the invention are about twice the value of the yield of the control soybean curd. This represents a highly advantageous attribute of the product of the invention.

The following tabulation (Table 2) shows protein content for the preferred curds, as well as a typical soybean curd precipitated with calcium sulfate. Note that protein content of curd formed with the preferred precipitants, for a 100% soybean milk mix and a 100% cheese whey milk mix, is higher than that derived by mixtures of the soybean and cheese whey materials. This phenomenon may be due to the interaction between soybean and cheese whey proteins to an extent that a hinderance to precipitation is effected.

was higher than curds formed only of soybean material. This is especially the case where the mixture curd of the invention was formed with GDL combined with either calcium sulfate or magnesium chloride. The half cystine content of the mixture curds of the invention made with GDL was found to be absent, which lowered the total sulfur-containing amino acid content. This, it is opined is due to experimental error. However, the methionine content increases when cheese whey is added to the mixture. It follows that cheese whey protein is a good

TABLE 2

| Treatment | The Protein Content of Soybean-Cheese Whey Curd (%; Dry Basis) | | | | | | |
|---|---|---|---|---|---|---|---|
| % Soybean | 100 | 60 | 55 | 50 | 45 | 40 | 0 |
| % Cheese Whey | 0 | 40 | 45 | 50 | 55 | 60 | 100 |
| CaSO$_4$ | 50.2 | | | | | | |
| G.D.L. | 57.1 | 56.0 | 56.5 | 55.7 | 55.5 | 53.8 | 57.7 |
| G.D.L. + CaSO$_4$ | 58.3 | 55.1 | 54.7 | 56.7 | 57.4 | 58.2 | 57.1 |
| G.D.L. + MgCl$_2$ | 57.0 | 55.2 | 54.3 | 57.1 | 55.4 | 57.0 | 57.0 |

Looking to Table 3 below, the amino acid composition of soybean curd, cheese whey curd, and a combined, equally proportional soybean-cheese whey curd is revealed. This table illustrates the quality of protein content of the product of the invention through a showing of the amino acid composition thereof, it being understood that the fundamental structural unit of protein is present as amino acid. The essential amino acids for humans are: arginine, cystine, histidine, isoleucine, leucine, lysine, methionine, phenylalanine, threonine, tryptophan, tyrosine, and valine. Histidine and arginine generally are included in the above grouping, inasmuch as they serve to maintain a nitrogen balance, while cystine and tyrosine replace methionine and phenylalanine. Methionine, affiliated with cystine, representing limiting amino acids, frequently is lacking in diet. In this regard, soybean curd is found to be high in lysine but low in methionine. See the following publication in this regard:

XIX. Schroder. D. J. and H. Jackson. "Preparation and Evaluation of Soybean Curd with Reduced Beany Flavor." J. Food Sci. 37 (3); 450, 1972.

sulfur-containing amino acid supplement to soybean protein. Note additionally, that all of the mixture curds of the invention had higher threonine content than a pure soybean material curd. Also, the combined precipitants of the invention showed higher lysine content than a pure soybean curd. Further, comparing the mixture curd results with the control material, i.e. a curd formed of soybean material precipitated with calcium sulfate, it is shown that other essential amino acid contents of the curd are increased to enhance product quality.

Turning now to FIG. 6, a subjective taste evaluation is revealed in graphic form for relative admixtures of soy and cheese whey materials. The chart shows that, at a preferred 50:50 proportion solids mix of soybean material and cheese whey material, an ideally bland product is achieved. As the soybean-cheese whey mixture from which the product is precipitated is adjusted to favor a higher soybean content, the product gradually assumes a "beany" aroma or taste. Conversely, as the mixture is altered to favor a higher cheese whey content, a "raw milky" taste gradually is recognized.

TABLE 3

| | The Amino Acid Composition of Soybean-Cheese Whey Curd (Micromole per 16 Milligrams of Sample) | | | | | | | | | |
|---|---|---|---|---|---|---|---|---|---|---|
| | CaSO$_4$ | G.D.L. | | | G.D.L. + CaSO$_4$ | | | 64 G.D.L. + MgCl$_2$ | | |
| Amino Acid | 100% S[a] | 100% S | 100% W[b] | 50% S / 100% S | 100% W | 50% W | 50% S / 100% S | 100% W | 50% W | 50% S |
| Lysine | 3.3 | 4.2 | 4.6 | 1.8 | 3.2 | 5.7 | 4.8 | 3.5 | 4.7 | 5.4 |
| Histidine | 1.3 | 1.3 | — | 1.0 | — | 1.3 | 1.3 | — | — | 1.4 |
| Ammonia | 5.8 | 8.1 | 6.9 | 6.1 | 7.9 | 7.5 | 8.0 | 7.9 | 6.9 | 7.6 |
| Arginine | 2.9 | 2.0 | 1.0 | 1.4 | 1.5 | 1.2 | 1.7 | 2.2 | 0.7 | 1.7 |
| Aspartic Acid | 7.1 | 7.2 | 6.6 | 5.4 | 6.5 | — | 6.9 | 7.3 | 7.4 | 7.5 |
| Threonine | 2.9 | 3.0 | 3.0 | 3.4 | 2.4 | 3.8 | 3.3 | 2.7 | 3.8 | 3.0 |
| Serine | 3.6 | 3.2 | 2.5 | 2.8 | 2.9 | 2.4 | 3.2 | 3.5 | 3.1 | 3.3 |
| Glutamic Acid | 8.0 | 8.7 | 7.3 | 6.9 | 7.8 | 8.1 | 7.8 | 8.5 | 8.0 | 8.2 |
| Proline | 4.3 | 4.7 | 3.4 | 2.9 | 3.6 | 4.1 | 3.6 | 4.3 | 3.8 | 3.6 |
| Glycine | 4.3 | 4.0 | 2.6 | 2.4 | 4.0 | 2.1 | 3.0 | 4.1 | 2.7 | 3.0 |
| Alaine | 4.2 | 4.4 | 4.8 | 4.0 | 4.3 | 5.0 | 5.3 | 3.7 | 5.5 | 4.5 |
| Valine | 4.3 | 4.1 | 3.7 | 3.6 | 3.8 | 4.5 | 4.0 | 3.7 | 4.1 | 3.6 |
| Half Cystine | 0.7 | 1.0 | 0.8 | — | — | 1.7 | 1.5 | 0.4 | 1.9 | 1.3 |
| Methionine | 0.4 | 0.7 | 0.9 | 1.1 | 0.6 | 1.6 | 1.0 | 0.6 | 1.1 | 0.7 |
| Isoleucine | 3.7 | 3.9 | 3.5 | 3.7 | 3.4 | 4.2 | 3.7 | 3.3 | 4.1 | 3.7 |
| Leucine | 4.9 | 6.2 | 5.4 | 5.9 | 4.8 | 6.9 | 6.6 | 5.4 | 7.0 | 6.0 |
| Tyrosine | 1.3 | 1.5 | 1.4 | 1.6 | 1.4 | 1.8 | 1.7 | 1.5 | 1.5 | 1.5 |
| Phenylalanine | 1.9 | 2.7 | 2.0 | 1.8 | 2.6 | 2.1 | 2.2 | 2.4 | 1.8 | 1.9 |

[a] S = soybean
[b] W = cheese whey

The data within Table 3 was obtained from samples which were hydrolyzed under reflux in 6 N hydrochloric acid for 24 hours following which the hydrochloric acid was removed by evaporation. Tryptophan generally is destroyed through use of a mineral acid catalyst.

The tabulation reveals that the total sulfur-containing amino acid content of the mixture curds of the invention Accordingly, the most preferred product of the invention is one providing for the noted equal admixture of soybean and cheese whey solids and utilizes the three above-designated precipitants.

Since certain changes may be made in the above described product and process without departing from the scope of the invention herein involved, it is intended that all matter contained in the description thereof or shown in the accompanying drawings shall be interpreted as illustrative and not in a limiting sense.

I claim:

1. A method for producing a bland nutritional food product from soybeans and sweet cheese whey consisting essentially of the steps of:
    comminuting soybeans in the presence of water to provide an aqueous dispersion thereof in water exhibiting a soybean material weight to water volume ratio selected between about 0.05 and 0.15;
    heating said aqueous dispersion at a temperature and over an interval selected for deactivating trypsin inhibitor;
    filtering said aqueous dispersion to remove non-suspended particulate matter;
    providing an aqueous dispersion of proteinaceous sweet cheese whey material in water exhibiting a whey material weight-to-water volume ratio selected between about 0.05 and 0.15;
    mixing said sweet cheese whey aqueous dispersion with said soybean aqueous dispersion following said trypsin inhibitor deactivation in about 1:1 ratio to provide an aqueous soybean-cheese whey mixture;
    heating said aqueous mixture to a temperature less than about 110° C; and
    precipitating a soybean-whey curd from said aqueous mixture by the addition thereto of a precipitant including as its principal ingredient, glucono-delta-lactone.

2. The method of claim 1 in which said precipitant is added in an amount representing a ratio less than about 0.01 weight thereof to volume of said aqueous mixture.

3. The method of claim 2 in which said precipitant is selected from the group consisting of glucono-delta-lactone, glucono-delta-lactone and calcium sulfate, and glucono-delta-lactone and magnesium chloride.

4. The method of claim 3 wherein said precipitant is selected as glucono-delta-lactone and is added in an amount representing a said weight-to-volume ratio of about 0.006.

5. The method of claim 3 wherein said precipitant is selected as glucono-delta-lactone and calcium sulfate and is added, respectively, in amounts representing weight-to-volume percentage ratios of about 0.6% and about 0.05%.

6. The method of claim 3 wherein said precipitant is selected as glucono-delta-lactone and magnesium chloride and is added, respectively, in amounts representing weight-to-aqueous mixture volume percentage ratios of about 0.6% and about 0.17%.

7. The method of claim 1 including the step of drying said soybean-whey curd to a powderous consistency.

8. The product of the process of claim 1.

9. The process of claim 1 including the step of drying said precipitated soybean-whey curd.

10. The product of the process of claim 9.

11. A method for producing a bland, nutritional semi-soft, pudding like food product having a penetration characteristic essentially as shown in FIG. 3 from soybeans and sweet cheese whey, consisting essentially of the steps of:
    providing an aqueous mixture of about equal amounts by solids weight of proteinaceous sweet cheese whey and proteinaceous soybean milk, said soybean milk having been heated in isolation from said sweet cheese whey over an interval selected for deactivating trypsin inhibitor, the protein content of said sweet cheese whey remaining in a substantially non-heat-denatured condition; coprecipitating a soybean-whey curd from said aqueous mixture by the addition thereto in an amount representing a percentage ratio of less than about 1 percent, weight-to-volume, a precipitant selected from the group consisting of: glucono-delta-lactone, glucono-delta-lactone and calcium sulfate, and glucono-delta-lactone and magnesium chloride; and
    separating said soybean-whey curd from the remainder of said aqueous mixture.

12. The method of claim 11 wherein said precipitant is selected as glucono-delta-lactone and is added in an amount representing a said percentage weight-to-volume ratio of about 0.6%.

13. The method of claim 11 wherein said precipitant is selected as glucono-delta-lactone and calcium sulfate which are added, respectively, in amounts representing weight-to-volume percentage ratios of about 0.6% and about 0.05%.

14. The method of claim 11 wherein said precipitant is selected as glucono-delta-lactone and magnesium chloride which are added, respectively, in amounts representing weight-to-aqueous mixture volume percentage ratios of about 0.6% and about 0.17%.

15. The method of claim 11 wherein each said cheese whey and said soybeans are provided in said aqueous mixture in weight-to-volume percentage ratios with respect thereto selected between about 5% and 15%.

16. The method of claim 11 wherein said aqueous mixture is retained at a temperature of about 92° C during said coprecipitation step.

17. The product of the process of claim 11.

18. The process of claim 11 including the step of drying said coprecipitated soybean-whey curd.

19. The product of the process of claim 18.

* * * * *